United States Patent [19]
Voorberg

[11] Patent Number: 5,769,332
[45] Date of Patent: Jun. 23, 1998

[54] EFFICIENT PRODUCTION OF LANDPLASTER BY COLLECTING AND CLASSSIFYING GYPSUM FINES

[75] Inventor: Dennis B. Voorberg, Mt. Hope, Canada

[73] Assignee: CGC Inc., Ontario, Canada

[21] Appl. No.: 630,140

[22] Filed: Apr. 10, 1996

[51] Int. Cl.$^6$ ............................ B02C 19/12; B02C 23/08
[52] U.S. Cl. ............................ 241/19; 241/23; 241/24.1; 241/29
[58] Field of Search ............................ 241/19, 23, 24.1, 241/27, 22, 29

[56] References Cited

U.S. PATENT DOCUMENTS

| | | | |
|---|---|---|---|
| 5,392,998 | 2/1995 | Suessegger et al. | 241/79.1 |
| 5,433,388 | 7/1995 | Hirz et al. | 241/23 |
| 5,580,002 | 12/1996 | Ward et al. | 241/17 |

OTHER PUBLICATIONS

Nordberg ® Grinding Mills Bulletin, Bulletin 463, Feb., 1982, Rexnord Inc., Process Machinery Division, Milwaukee, Wisconsin, esp. pp. 23 & 27.

ABB Raymond Tech Talk, First Issue 1991, vol. IX, No. 1, esp. pp. 1 & 3.

"Construction Materials", Gypsum and Anhydrite, Frank C. Appleyard, *Industrials Minerals and Rocks*, 5th ed., S.J. Lefond, ed., AIME, 1983, pp. 183–198, esp. p. 191.

*Primary Examiner*—John M. Husar
*Attorney, Agent, or Firm*—Greer, Burns & Crain, Ltd.

[57] ABSTRACT

A landplaster production method includes the steps of providing a supply of particulate gypsum material, drying the gypsum material by passing a stream of heated air thereby as the material is rotated, classifying and separating the dried particles into fines and coarse particles, collecting the suspended fines in a collector, passing the coarse particles to a grinder such as a roller mill for reducing the particles, and mixing the reduced particles with the collected fines for processing into landplaster. The elimination of fines from the feed to the grinder results in significantly greater production by increasing the efficiency of the grinder. Further, the dryer is modified to agitate the dried gypsum material so that it may be more easily introduced into the classifier/separator situated adjacent the drier discharge outlet.

8 Claims, 4 Drawing Sheets

EFFICIENT PRODUCTION OF LANDPLASTER BY COLLECTING AND CLASSSIFYING GYPSUM FINES

BACKGROUND OF THE INVENTION

This invention relates generally to a method for producing landplaster, and more particularly to a method for increasing the efficiency of a conventional landplaster production facility though more effective collection of gypsum fines.

Natural gypsum is a mineral found in large deposits in open pits and underground. One common method for processing the gypsum rock is to use a series of primary and secondary crushers and screens to obtain a desired size or size range of the product. The particle size of the crushed and screened gypsum rock will vary with the requirements of the landplaster producer, but generally falls within a range of 1½ to 2" top size to ¼ to ½" bottom size.

Crushed gypsum rock is difficult to handle in that it does not flow freely. Conventional landplaster production systems generally include a dryer that dries the purified gypsum rock prior to fine grinding to make it easier to handle. This drying process generally includes a rotary dryer provided with screw flights to prevent the generation of dust, and to move the material from an input end towards an output end. In a typical facility, the dryer is temperature controlled so that its internal temperature does not exceed 120° F. After being subjected to primary and secondary crushing and screening operations, fine grinding of mined gypsum rock is generally accomplished by air-swept roller mills fitted with integral air separators for better control of particle size. A preferred type of roller mill is sold under the designation Raymond mill. The Raymond mill is designed to accept an optimum input size of −¾" of feed material. In the past few years, high-energy impact mills plus air classifiers also have been used. One drawback of such conventional rock processing systems is that the air classifiers are limited to removing only the unwanted dust from the material flow.

In a conventional landplaster production system, the rotary dryer is approximately 110 feet long and turns at approximately 4 to 5 revolutions per minute, with a maximum drying capacity of 81.63 tons (90 metric tonnes) per hour, while the Raymond mill has a maximum grinding capacity of 63.49 tons (70 metric tonnes) per hour. Therefore, the production rate for the entire system is limited by the Raymond mill output.

It has been found that conventional handling of gypsum rock dust or fines of −100 mesh, i.e. material that is 100 µm (0.0039 inches) or less in size, acts as a negative influence on the production rate of the landplaster production system. This is because the fines are fed into the Raymond mill along with larger sized particles of the dried gypsum rock, where the fines take up space, clogging the Raymond mill. As the fines do not need to be ground, in effect the Raymond mill consumes power stirring the fines around without decreasing or otherwise affecting their size. The presence of fines in the Raymond mill decreases the available grinding capacity for larger particles which actually require grinding, and thus detracts from the production capacity of the entire system. Excessive amounts of fines in the Raymond mill also tend to choke the air flow out the mill discharge, further impeding production.

Attempts to solve this problem include speeding up the grinding mill, however that effort resulted in significantly higher mill maintenance costs which offset the increase in production. Other attempted solutions to this problem include efforts to reduce the amount of fines introduced into the Raymond mill. While the primary and secondary crushing steps include screening to reduce the amount of fines generated, significant amounts of fines are still found in the feed to the Raymond mill. In another effort to reduce fines in the roller mill feed, the prior art production system also includes a dust housing and a dust collector with a specifically designed duct connection to eliminate fines from the production system. However, this equivalent has also failed to satisfactorily limit the amount of fines in the roller mill feed.

Thus, the prior art system does not solve the production capacity problems discussed above. Therefore, the Raymond mill still consumes excess power stirring the fines without affecting their size. Second, removing the fines using current methods does not increase the prior art system production capacity. Despite the above-listed attempts, the system production capacity is still limited by the output of the Raymond mill.

Thus, there exists a need to improve the production capacity of a landplaster production system. There is further a need to improve the processing of fines in the system to reduce the amount of fines passed to the Raymond mill.

Accordingly, a first object of the present invention is to provide an improved landplaster production system with increased production capacity and efficiency.

A further object is to provide an improved landplaster production system wherein a significant proportion of fines are separated from the main flow of material prior to grinding in the roller mill.

Other objects and advantages of the invention will become more apparent from the following description and accompanying drawings.

SUMMARY OF THE INVENTION

The above identified objectives are met or exceed by the present landplaster production method and system. An important feature of the present method for producing landplaster is that modifications are made to the rotary dryer that dries the gypsum particles prior to grinding in the roller mill. The outlet end of the dryer is modified to agitate the gypsum material as it is dried, so that lighter coarse particles, and fines become suspended in the heated air flow. Another feature of the invention is the placement of a classifier/separator connected to both the output end of the rotary dryer and the input end of a fines collector. The classifier receives the suspended agitated gypsum particles and separates them into fines and coarse particles, where the fines are eliminated from the roller mill feed and are collected by the collector. The coarse particles are passed to the roller mill. The collector includes an air sweep that draws up the fines and the lighter coarse particles and transports them under a vacuum to the collector using a feeding system that is specifically designed so that the velocity of the air sweep is not impeded. Thus, fines are substantially eliminated from the input feed to the roller mill.

More specifically, the present invention includes a landplaster production method including the steps of providing a supply of particulate gypsum material, drying the gypsum material by passing a stream of heated air thereby as the material is rotated, classifying and separating the dried particles into fines and coarse particles, collecting the suspended fines in a collector, passing the coarse particles to a grinder for reducing the particles, and mixing the reduced particles with the collected fines for processing into landplaster.

In another embodiment, the present invention provides a system for producing landplaster includes a dryer having a feed end and an outlet end, provided with a stream of heated air passing therethrough, for drying a supply of a particulate gypsum material and for agitating said material at the outlet end so that a significant amount of the particles are suspended in the air stream. An air sweep device draws up the suspended particles flowing through the dryer, and a classifier is connected to the dryer and is in fluid communication with the air sweep device for classifying and separating the suspended particles into fines and coarse particles so that the fines are passed to a collector. The collector is in fluid communication with the classifier, for collecting the fines under suction. The system also includes a grinder is in communication with the classifying means, for grinding the coarse particles into acceptable sized particles. The grinder is preferably a roller mill with its own rotary classifier, such as a whizzer classifier.

It is preferred that the present landplaster production system include a dryer having at least two types of flights, a straight flight and a curved flight, where the straight flight moves the material from the feed end of the dryer to the output end as it dries, while the curved flights, located at the outlet end, agitate the material, throwing the dried particles into the air stream, where a significant proportion of the particles remain suspended. In addition, the present landplaster production system preferably includes a classifier, such as a whizzer classifier, connected to the output end of the dryer. In this manner, the fines and lighter coarse particles suspended in the air stream are separated by the classifier, and the fines are swept up by the air sweep under suction. Further, the present system preferably includes a generally straight duct that feeds fines to the collector at a relatively high velocity.

DETAILED DESCRIPTION OF THE PREFERRED EMBODIMENT

Figure 1:
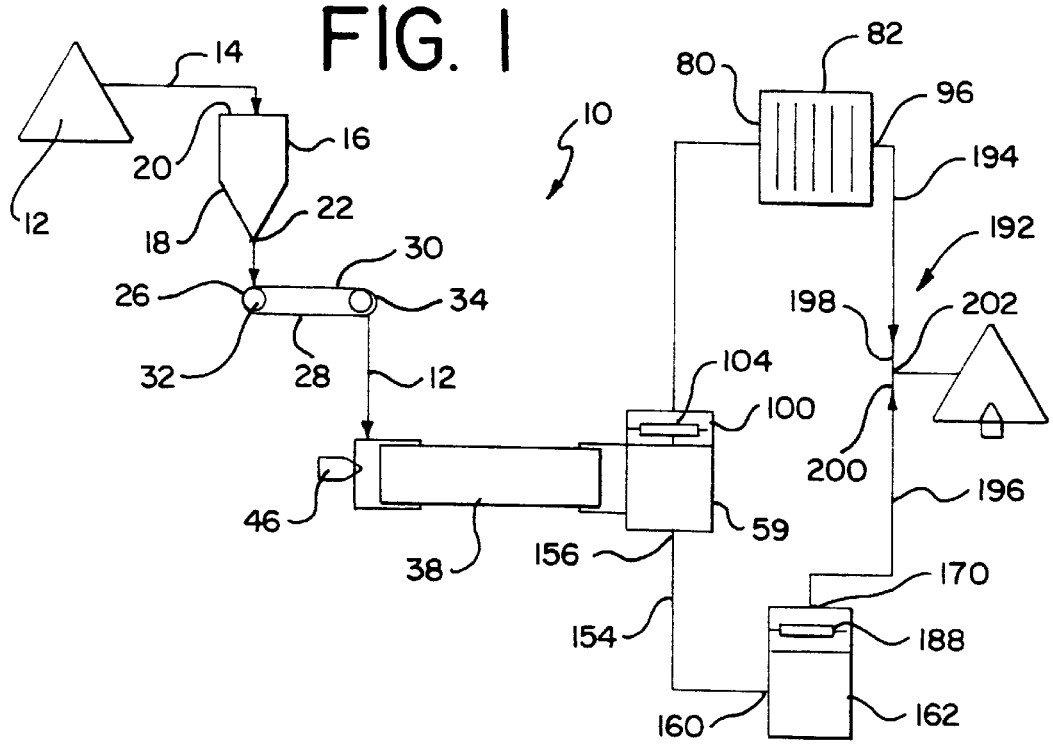
FIG. 1 is a block diagram of the landplaster production system in accordance with the present invention.

Referring now to FIG. 1, a landplaster production system, generally designated 10, is supplied with a purified gypsum rock 12. The purified gypsum rock 12 is loaded by a loader mechanism 14 into a hopper 16. In the embodiment depicted in FIG. 1, the hopper 16 has an outer housing 18 with an open end 20 and a gravity-fed end 22 opposite the open end 20. The loader mechanism 14 loads the purified gypsum rock 12 into the open end 20, where it flows down to the gravity-fed end 22. The stream of purified gypsum rock 12 flows out of the gravity-fed end 22 of the hopper 16 onto a load end 26 of a conveyor apparatus 28. In the depicted embodiment, the conveyor apparatus 28 has an endless belt 30 that revolves around at least two rollers 34 as is well known in the art, however, other suitable types of conveyors are contemplated.

Figure 2:
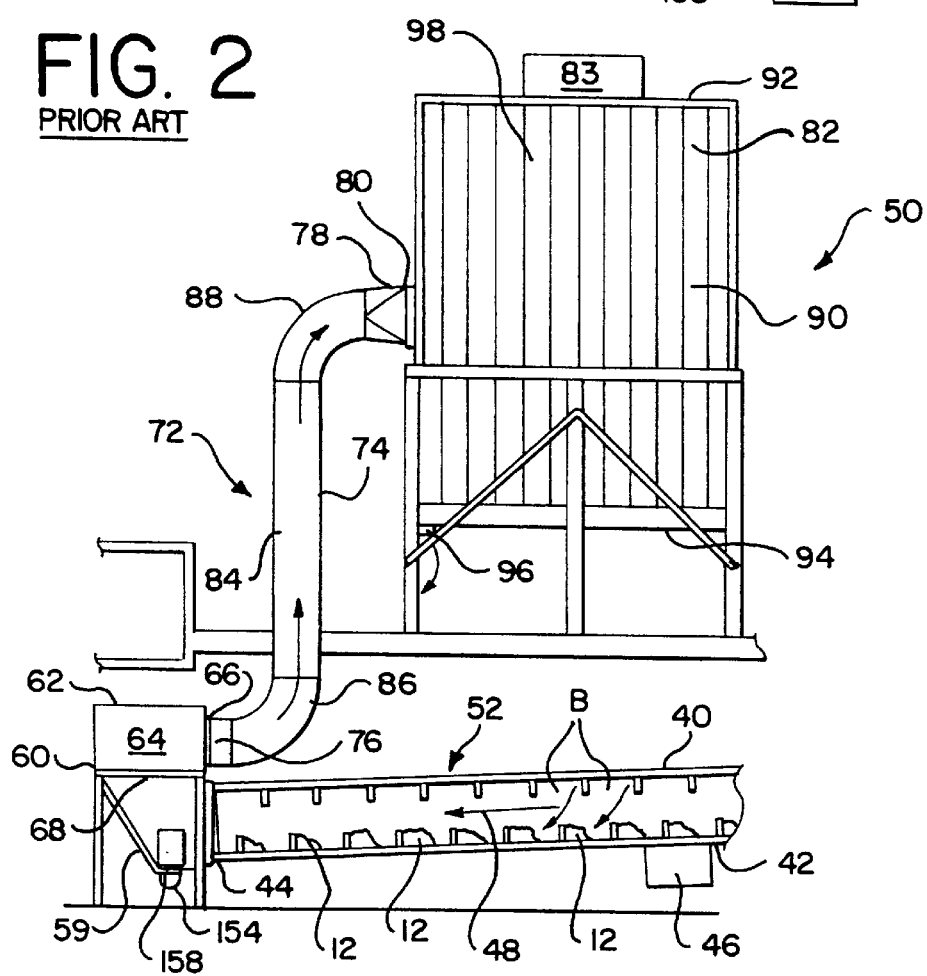
FIG. 2 is diagrammatic elevational view of the dryer and the dryer dust collector of the prior art, with the dryer shown in section.
Figure 3:
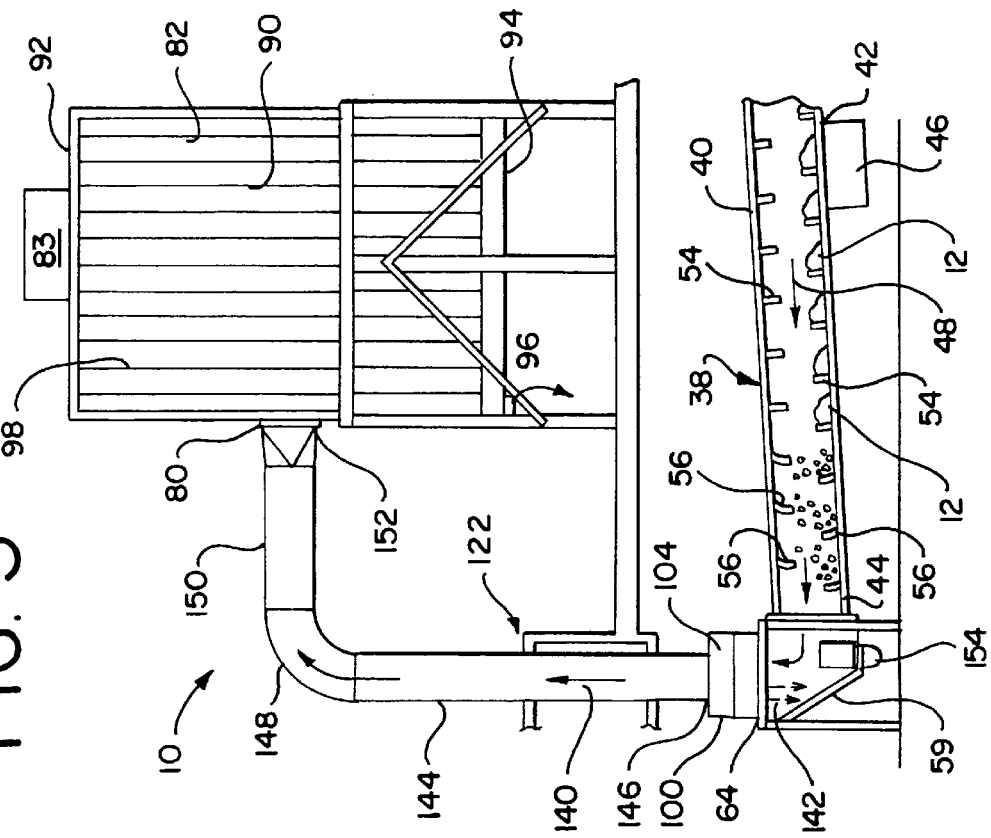
FIG. 3 is a diagrammatic elevational view of the dryer, classifier and dust collector of the landplaster production system shown in FIG. 1, with the dryer shown in section.

Referring now to FIGS. 1–3, the supply of gypsum rock 12, made up of fines and coarse particles, is discharged from a discharge end 34 of the conveyor apparatus 28 into a dryer 38. Preferably the dryer 38 is of the rotary type, having a generally cylindrical shape formed by a housing 40 with a feed end 42, an outlet end 44, and a heat source 46 located at the feed end 42. The heat source 46 includes a blower mechanism (not shown) which creates and directs a stream of heated air 48 that passes through and along a central axis of the dryer 38. Furthermore, the dryer 38 is elevated so that the feed end 42 is positioned higher than the outlet end 44, thus the gypsum rock 12 moves through the dryer 38 partially due to the difference in height between the two ends. While the above type of dryer is preferred, other configurations are contemplated.

Figure 6:
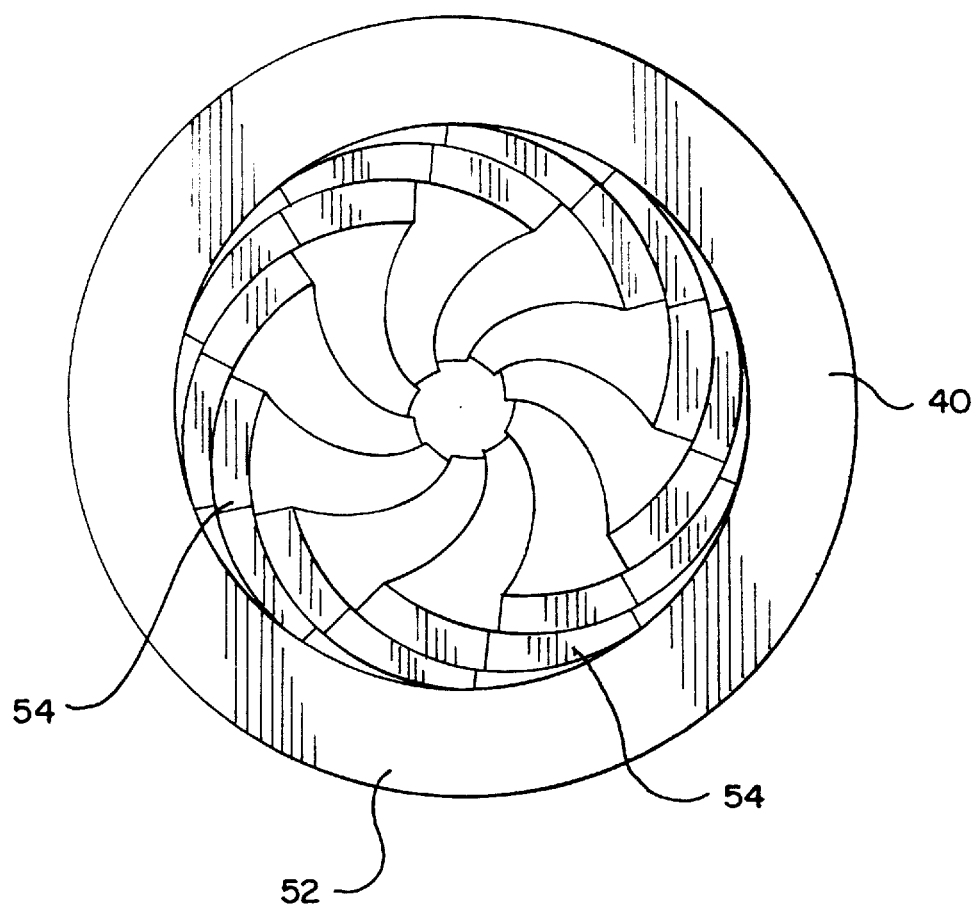
FIG. 6 is an end view of the dryer of FIG. 3.

Referring now to FIGs. 2 and 6, a portion of a prior art landplaster production system, generally designated 50, is depicted. In the prior art system 50, the purified gypsum rock 12, made up of a range of particle sizes, including fines and coarse particles, is discharged from the discharge end 34 of the conveyor mechanism 28 into a prior art dryer 52. As depicted, the dryer 52 has many components in common with the dryer 38, and those are designated with identical reference numerals. The dryer 52 is approximately 110 feet long, and rotates axially at a rate of about 4 to 5 revolutions per minute. The dryer 52 contains a plurality of straight flights 54 (best seen in FIG. 6) that, along with the height differential of the two ends and the rotation of the dryer 52, move the gypsum rock 12 from the feed end 42 to the outlet end 44, in a generally helical path as indicated by the arrows B.

As the gypsum particles 12 move through the rotary dryer 52, they are dried by the heated air 48. It is significant to note that the design of the dryer 52 is intended to keep fines and dust out of the stream of air 48. Instead, the rock particles of all sizes are collected by the flights 54 and retained against an inner face of the housing 40. The outlet of the dryer 52 is fed into a funnel-shaped mixing housing 59. A dust housing 60 is shown mounted on top of the housing 59 and is in fluid communication with the outlet end 44 of the rotary dryer 52. As shown, the dust housing 60 has a generally box-like configuration with a top planar portion 62 and at least one and preferably four side walls 64. The housing 60 has at least two openings, a fines outlet 66 in one of the side walls 64, and a dust feed opening 68 in a lower end opposite the top planar portion 62.

The prior art system 50 also includes a duct-type feeding system, generally designated 72, sealingly connected to the side wall 64 in a known manner typical with such ducting systems. The feeding system 72 includes a main duct 74 with at least two openings, a duct inlet 76 connected to the side wall 64 of the dust housing enclosure 60, and in fluid communication with the fines outlet 66, and a duct outlet 78 connected to a collector inlet 80 of a dust collector 82. A suction or air sweeping action is generated by a fan or blower 83, also called an air sweep, in the dust collector 82 to draw dust through the feed system 72.

An important feature of the prior art feeding system 72 is that the duct 74 is specifically designed to impede the flow of the dust and fines therethrough to the dust collector 82. As such, the duct 74 is designed to have at least one straight piece 84 and at least a lower goose-neck or elbow 86, and an upper elbow 88, and such configuration of the duct acts as a trap to reduce air pressure within the system 72 to impede the flow of fines through the duct 74.

The dust collector 82 is fastened to the duct outlet 78 by suitable fasteners as are known in the art. The dust collector 82 has a preferably drum-like shape formed by a collector housing 90 and a generally planar top and bottom portions 92, 94, respectively. The housing 90 has preferably two openings, the collector inlet 80 connected to duct outlet 78 and in fluid communication with the air sweep 83, and at least one collector discharge 96. Dust particles collected by the collector 82 are retained by at least one collector filter 98. In the preferred embodiment, the collector filters 98 are polyester filter bags. The collected particles are removed from the collector filters 98, passed through the collector discharge 96, and are ultimately mixed with the reduced, formerly coarse particles prior to calcining. In the prior art system 50, the fines collected in the dust collector 82 are ultimately combined with the feed product of the roller mill, as will be described below.

Thus, it will be seen that the prior art system 50 is primarily concerned with removing dust, not fines, from the feed to the roller mill. As such, there will be a substantial proportion of fines mixed-in with the material ground by the roller mill, thus reducing its efficiency.

Figure 5:
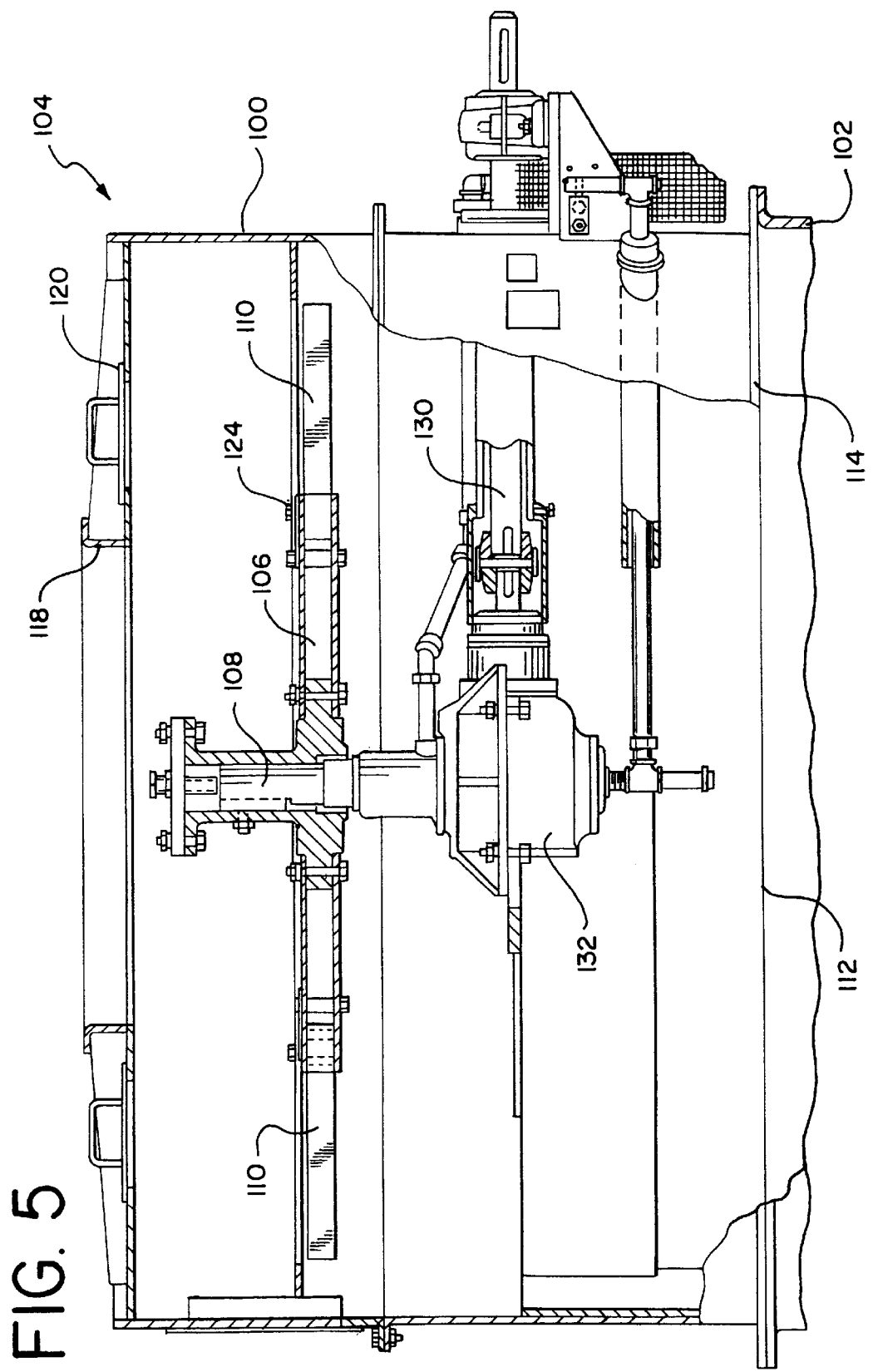
FIG. 5 is a vertical sectional view of a double disk whizzer classifier.

Referring now to FIGS. 1, 3 and 5, the description continues of the processing of landplaster according to the present system 10. Referring specifically to FIG. 3, the dryer 38 has been modified from the configuration of the dryer 52 by changing the configuration of flights 56 located closer to the outlet end 44. Specifically, the flights 56 are curved to agitate the gypsum material 12 and to cause it to become suspended in the air stream 48 passing through the dryer 38. Thus, a greater percentage of larger sized particles, including fines, will be suspended in the air stream 48 in the present system than with the prior art system 50 of FIG. 2, in which by design the particles remain out of the air stream.

Figure 4:
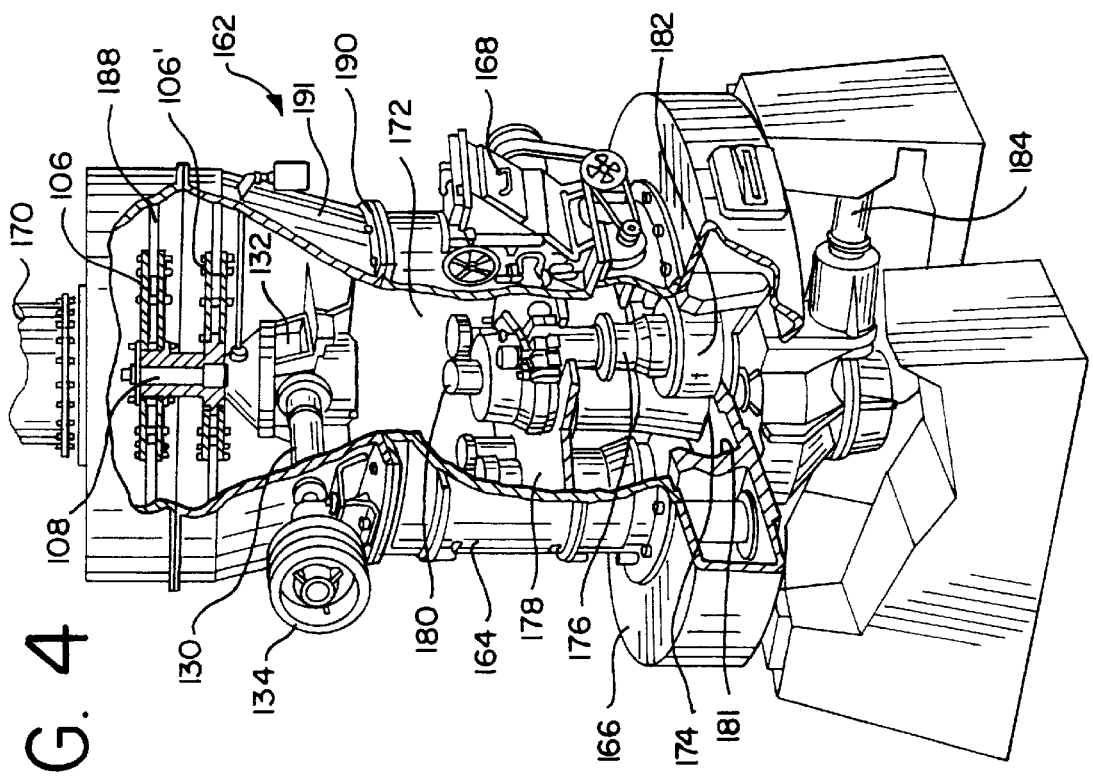
FIG. 4 is a cut away front perspective view of the Raymond mill and attached whizzer classifier.

A main object of the present system is to separate most, if not all, of the suspended fines from the flow of gypsum going to the roller mill. To that end, a classifying housing 100 replaces the dust housing 60 and is fastened to the mixing housing 59. As such, the classifying housing is in fluid connection with the outlet end 44 of the rotary dryer 38. Preferably, the housing 100 has a generally box-like configuration forming the housing of a classifier and separator, generally designated 104. Preferably, the classifier and separator 104, commonly known as a whizzer classifier, has at least one, but preferably two, disks 106 that are mounted to an axial rotating shaft 108. At least one, and preferably a plurality of blades 110 are mounted to each disk 106 in peripherally spaced relation to each other to define a series of intermittent spaces about the circumference of the disk. A double disk whizzer is shown in FIG. 4, described in greater detail below. It is also contemplated that a turbine classifier could be substituted for the whizzer classifier 104.

Referring now to FIG. 5, the whizzer classifier 104 is shown in greater detail. Preferably, the whizzer 104 has an inlet 112 formed at a bottom end 114 in fluid communication with an upper end of the mixer housing 59. Opposite the inlet 112, a discharge outlet 118 is defined in a generally planar lid 120, which is in fluid communication with an inlet 120 of the present feeding system 122, a modification of the feeding system 72, and described in greater detail below in relation to FIG. 3. Each blade 110 is mounted to the corresponding disk 106 by at least one threaded fastener, preferably a bolt 124. The blades 110 are dimensioned and arranged in a spaced array to allow smaller particles to pass between adjacent blades. The shaft 108 is rotated by a countershaft 130 through a differential 132. A belt driven shieve 134 (best seen in FIG. 4) drives the countershaft 130, and is itself driven by a motor (not shown) at a variety of speeds through belts as is well known in the art.

Referring now to FIGs. 1 and 3, the processing of the landplaster continues in the present system of the invention. The air stream 48 is mixed and combined with the air sweep or air suction generated by the blower 83 or equivalent device located in the dust collector 82. A strong, relatively high velocity flow of air is created up through the feeder system 122, which is a modification of the feeder system 72, as will be described below.

An important feature of the present system 10 is that the gypsum particles 12 which are suspended in the air stream 48 are classified as to size prior to being fed to the roller mill, preferably, a Raymond mill, for further grinding. This feature is accomplished by the operation of the whizzer classifier 104 adjacent the outlet of the dryer 38 and also adjacent the inlet of the feeder system 122. The rotation of the disk or disks 106, and the spacing of the blades 110 allow suspended fines to pass into the feeder system 122, as depicted by the arrow 140, while the larger particles impact the whizzer blades 110 and are deflected back to a lower end of the classifier housing 100, as depicted by the dashed arrows 142. Thus, the whizzer classifier 104 acts as a filter which controls the size of particles allowed to pass to the dust collector 82, however the volume of such particles is significantly increased over the system 50 of FIG. 2.

Referring now to FIG. 3, as to the flow of fines, once past the whizzer classifier 104 (depicted by the arrow 140), the system 122 differs from the system 72 in that the former is designed to at least maintain, and preferably increase (rather than impede) the air flow velocity to the dust collector 82. To that end, the feeder system 122 includes a main duct 144 having a duct inlet 146 connected to the housing 100 and being in fluid communication with the discharge outlet 118 of the whizzer classifier 104. It is preferred that the velocity of the air sweep generated by the blower 83 not be diminished as it passes through the duct 144. Therefore, the duct 144 extends generally straight, and vertically upward from the whizzer 104 to an elbow 148, connected to a second straight conduit tube 150 which includes a duct outlet 152. Connection is made between the duct outlet 152 and the dust collector inlet 80. The smaller, faster moving fines are carried by the air flow into the dust collector 82, without the intentional decrease in velocity which is designed into the prior art feeder system 72.

Referring now to FIGS. 1 and 3, the coarse particles deflected by the whizzer classifier 104 to the bottom of the classifier housing 100 fall into the mixer housing 59 and are collected by a conveyor apparatus 154, which in the preferred embodiment is a screw conveyor having a feed end 156 connected to an opening 158 in the housing 59. Opposite the feed end 156, a discharge end 160 is connected to a grinder 162. While the screw conveyor 154 is diagrammatically shown, other types of material moving conveyors are contemplated.

Referring now to FIGs. 1 and 4, the depicted grinder 162 is a roller mill, a preferred type of which is sold under the designation Raymond mill, manufactured by ABB Raymond, Concordia, Kans. The preferred Raymond mill 162 has a generally cylindrical main housing 164 with a lower portion 166 of larger diameter, also called a scroll section, which has an air inlet. A grinder feed inlet 168 is connected to the conveyor discharge end 160, a grinder discharge outlet 170 is located at an upper end of the main housing 164, and a grinding chamber 172 where the coarse particles are ground.

The Raymond mill 162 also includes a plurality of rotating rolls 174 mounted on a journal assembly 176 for free rotation. Each journal assembly 176 is supported by a horizontal plate 178, called a spider, which is mounted on a main shaft 180. Fixed shovel like plows 182 (one for each roll) are mounted on supports (not shown) attached to the spider assembly 178. The main shaft 180 is connected by a horizontal drive shaft 184 located below the Raymond mill 162. A motor (not shown) is connected to the drive shaft 184, through a shieve and v-belts (not shown) as is known in the art.

As the main shaft 180 rotates, each journal assembly 176 pivots freely and causes the rolls 174 to swing out and contact an inner surface of a grinding ring 181. As the velocity of the main shaft increases, more centrifugal force is applied by the rolls to the grinding ring, which creates the grinding action of particles fed into the grinding chamber 172. In addition, the rotation of the main shaft 180 causes the plows 182 to rotate, which also scoop up the coarse material and force it between the rolls and the grinding ring.

A second classifier and separator, generally designated 188 is connected to an upper portion 190 of the Raymond mill 162. Preferably, the second classifier separator 188 is also a whizzer classifier similar to the classifier 104, and identical components are designated with corresponding reference numbers, with the same generally box-like configuration formed by a housing 191 attached to the housing 164. The classifier 188 differs from the unit 104 in that it is provided with two disks 106, 106' each rotatably mounted to the shaft 108. In all other respects, the second classifier 188 operates in the same manner as the whizzer 104, and the larger, slower moving (unacceptable sized) particles are struck by the blades 110 and deflected back into the grinding chamber 172 where they are reground, while the smaller, faster moving (acceptable sized) particles escape contact with the blades 110, moving out the discharge outlet 170, where they are mixed with the fine particles output from the duct collector 82 to form landplaster, which is heated or calcined to produce stucco. An internal fan system (not shown) in the Raymond mill 162 creates a suction in the grinding chamber 172 which draws the finely ground particles upward toward the classifier 188 and ultimately out the outlet 170.

Referring now to FIG. 1, the output of the Raymond mill 162 is mixed with the fines collected in the dust collector 82 in a mixing apparatus 192 connected to both the dust collector 82 and the second whizzer 188. The mixing apparatus 192 is preferably a pair of ducts, first and second mixing ducts 194 and 196, respectively connected to the dust collector discharge 96 and to the grinder discharge 170. Outlets 198, 200 of the ducts 194, 196 are joined at mixing point 202. The mixed fine particles are then transported to a calcining kettle 204 for processing into landplaster, as is well known to skilled practitioners.

While some improvement in production capacity of the system 10 was anticipated, the final results were unexpected. The addition of the whizzer classifier 104 after the dryer 38 efficiently removed up to 90% of the fines in the purified gypsum material 12 which was loaded into the dryer 38. In the system 10 as depicted, this translated into 9.07 tons (10 metric tonnes) per hour of fines separated out by the whizzer 104. As a result, the overall production of capacity of the system 10 rose from 63.52 tons (70 metric tonnes) per hour to 72.59 tons (80 metric tonnes) per hour, an increase of 14.3% in production. This increase in production results in a corresponding increase in the landplaster capacity of the system, and a similar increase in gypsum wallboard is achieved.

Moreover, using the whizzer 104 to separate out the fines resulted in the dryer 38 being used more efficiently. Instead of only drying 63.52 tons (70 metric tonnes) per hour or 77.77% of its total drying capacity, the dryer 38 now dries 72.59 tons (80 metric tonnes) per hour, 9.07 tons (10 metric tonnes) of the fines 160 and 63.52 tons (70 metric tonnes) of the coarse material 162. This results in the dryer 38 using 88.89% of its drying capacity, a 14% percent increase in percent capacity. In effect, the system 10 is 14% more efficient than the prior art system 50.

While a particular embodiment of the invention has been shown and described, it will be appreciated by those skilled in the art that changes and modifications may be made thereto without departing from the invention in its broader aspects and as set forth in the following claims.

What is claimed is:

1. A landplaster production method, comprising the steps of:

providing a supply of particulate gypsum material;

drying said gypsum material by passing a stream of heated air thereby and simultaneously agitating said gypsum material to suspend fines and smaller particulates in the stream of heated air;

classifying and separating said dried and suspended particles into fines and coarse particles;

collecting said suspended fines in a collecting means which separates said fines from said coarse particles so that said fines are not ground in a grinding means;

passing said coarse particles to said grinding means for reducing said particles; and mixing said reduced particles with said collected fines for processing into landplaster.

2. The method of claim 1 further including performing said collecting step under suction, to achieve a desired velocity, so that said classified fines are passed to said collecting means by substantially maintaining said velocity.

3. The method of claim 1 further including performing said classifying and separating with a rotating classifier.

4. The method of claim 3 wherein said rotary classifier is a whizzer classifier.

5. The method of claim 1 further including classifying and separating said material in of said grinding means so that unacceptable sized particles are reground until an acceptable size is obtained.

6. The method of claim 5 wherein said classifying and separating is performed in said grinding means by a rotary classifier.

7. The method of claim 1 wherein said drying and agitating step is performed by a dryer, and further including providing at least one curved flight in said dryer for agitating said particles into said air stream.

8. A landplaster production method, comprising the steps of:

providing a supply of particulate gypsum material;

drying said material by passing a stream of heated air thereby at a velocity;

agitating said material simultaneously as it is dried so that a portion of said particulate material becomes suspended in said air stream;

classifying and separating said dried and suspended particulate material into fines and coarse particles;

feeding said fines in said air stream to a collector in a manner which does not diminish said velocity, and so that said fines are removed from a flow of said coarse particles after said classifying and separating step;

passing said coarse particles to said grinding means for reduction;

classifying and separating an output of said grinding means so that unacceptable sized particles are reground until an acceptable size is obtained; and mixing said ground particles with said collected fines.

* * * * *